United States Patent [19]

Roura

[11] B 4,001,351
[45] Jan. 4, 1977

[54] PROCESS FOR PREPARING TETRAFLUOROETHYLENE-HEXA-FLUOROPROPYLENE COPOLYMER BLENDS

[75] Inventor: Miguel Jacinto Roura, Parkersburg, W. Va.

[73] Assignee: E. I. Du Pont de Nemours and Company, Wilmington, Del.

[22] Filed: Apr. 3, 1975

[21] Appl. No.: 564,902

[44] Published under the second Trial Voluntary Protest Program on March 23, 1976 as document No. B 564,902.

[52] U.S. Cl. .............................. 260/900; 526/254; 528/481
[51] Int. Cl.[2] ....................................... C08L 27/12
[58] Field of Search ................................. 260/900

*Primary Examiner*—Carman J. Seccuro

[57] ABSTRACT

It is known to heat treat melt-processible blends of copolymers of tetrafluoroethylene and hexafluoropropylene in the molten state at elevated temperatures for several hours in the presence of an atmosphere containing water vapor in order to remove volatile material from the copolymer and to improve the thermal stability of the copolymer. Such heating results in foaming of the molten copolymer which is undesirable because it slows down the production rate. According to the process of this invention, the production rate can be increased by employing two or more of the copolymers separately in the heat treatment, at least one copolymer having a melt viscosity higher, and at least one copolymer having melt viscosity lower, than the final desired viscosity of the blend, and then blending the copolymers after the heat treatment.

4 Claims, 1 Drawing Figure

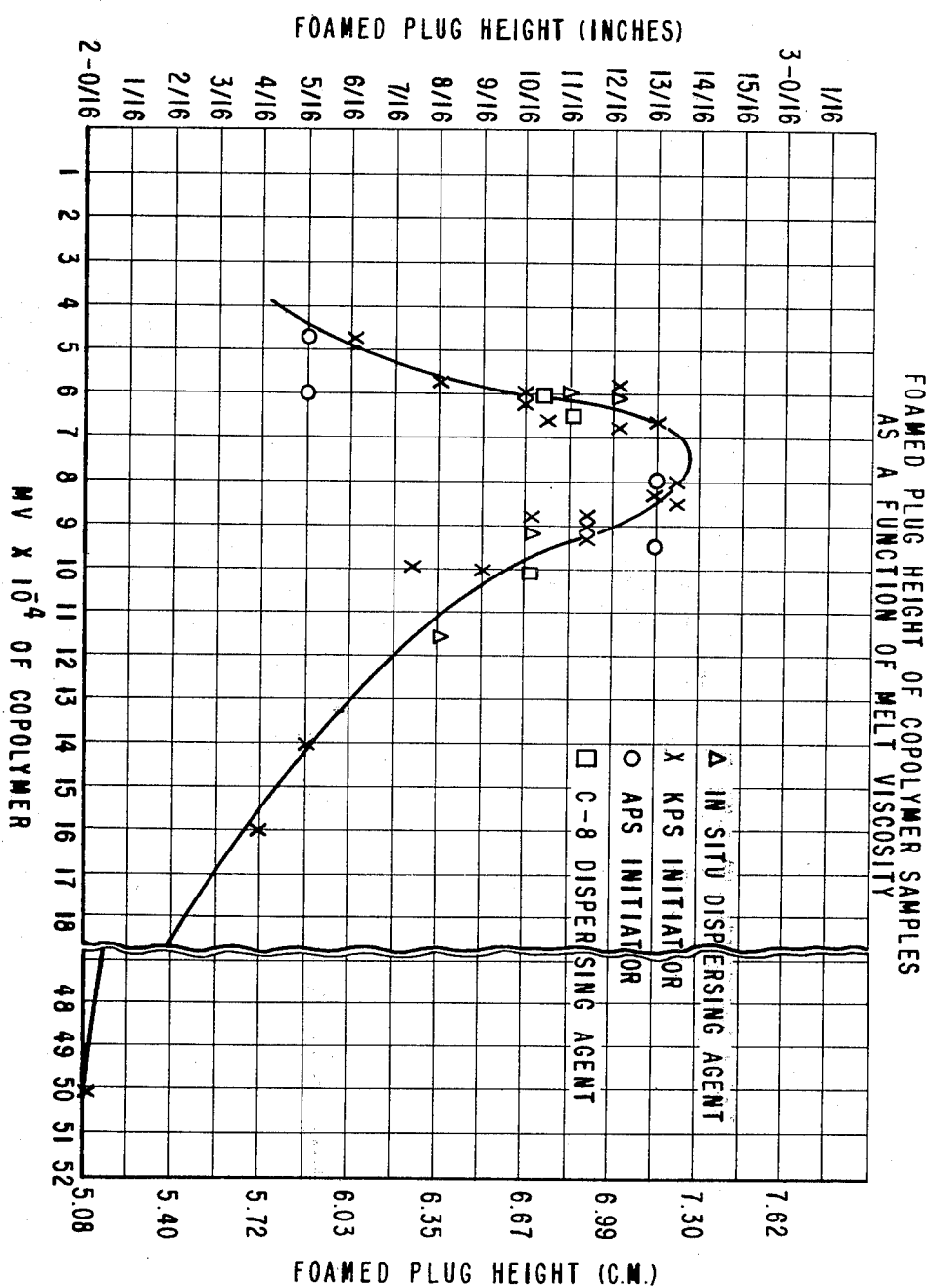

PROCESS FOR PREPARING TETRAFLUOROETHYLENE-HEXAFLUOROPROPYLENE COPOLYMER BLENDS

FIELD OF THE INVENTION

This invention relates to a process for stabilizing fluorocarbon polymers, and, more specifically, to a process for increasing the production rate during the heat stabilization of melt-processible blends of copolymers of tetrafluoroethylene and hexafluoropropylene.

BACKGROUND OF THE INVENTION

Melt-processible copolymers of tetrafluoroethylene and hexafluoropropylene (TFE/HFP) have long been known, and can be prepared as described in Bro et al. U.S. Pat. No. 2,946,763. However, the stabilization of the copolymers, through freeing them of volatiles by heating, has remained a problem in the preparation procedures. Bro et al. teaches the stabilization of the copolymers by heating them at 300°–400°C. for 0.15 to 30 hours.

Mallouk et al., U.S. Pat. No. 2,955,099, discloses that a change in melt viscosity may occur during the heat stabilization procedure of Bro et al.; and teaches that to stabilize the copolymers against this melt viscosity change, a small amount of a cationic metal compound should be added.

Schreyer, U.S. Pat. No. 3,085,083 adds still another improvement. Schreyer teaches that if the heat treatment is carried out at 200°–400°C. in the presence of water which is present in an amount of at least 2% by weight of the copolymer environment, stabilization is achieved through endcapping of the copolymer. Preferably, the Schreyer treatment is carried out at 340°–380°C. for 2–5 hours in air containing at least 3 weight percent water vapor. This preferred treatment will be referred to hereinafter as the humid heat treatment.

The procedures for improving the thermal stability of melt-processible TFE/HFP copolymers, as taught by the above-described patents, cause the volatilization of monomer and other gases and result in copolymers that are relatively stable to heat. Such volatilization causes the copolymers to foam and rise like bread dough. This effect can cause overflowing of the equipment used for the humid heat treatment, and consequently the foaming places a limit on the amount of copolymer which can be placed in the equipment. Thus, the foaming can limit the rate of production of the finished heat-stable copolymer.

SUMMARY OF THE INVENTION

It has now been found that by separately processing in the humid heat treatment each melt-processible tetrafluoroethylene-hexafluoropropylene copolymer to be placed in the final blend, the total processing time can be reduced by a length of time surprisingly greater than one would expect.

Specifically the process of this invention is a process which comprises heating separately at between about 340°C. and about 380°C. for a time sufficient to remove substantially all volatiles in an atmosphere of air containing between about 3% and about 20%, preferably 3% and 6%, of water vapor, based on weight of atmosphere, groups of melt-processible copolymers of tetrafluoroethylene and hexafluoropropylene having between about 6.75 and about 27 weight percent hexafluoroethylene:

one said group of such copolymers comprising at least one or more copolymers having a melt viscosity that is between about $13 \times 10^4$ and $50 \times 10^4$ poise at 372°C.;

a second said group of such copolymers comprising at least one or more copolymers having a melt viscosity that is between about $1 \times 10^4$ and $5 \times 10^4$ poise at 372°C.; and optionally, a third said group of such copolymers comprising at least one or more copolymers having a melt viscosity of between about $5 \times 10^4$ and $13 \times 10^4$ poise at 372°C.;

and combining each said group in a ratio depending on the desired melt viscosity for the blend.

DESCRIPTION OF THE DRAWINGS

The FIGURE is a graph which plots the height of the foam formed during the humid heat treatment of a number of TFE/HFP copolymers which have been polymerized by several procedures, viz, by changing the initiator or by altering the mode of dispersant addition. It is seen that regardless of the polymerization procedure used, the degree of foaming that occurs depends on the melt viscosity (MV) of the copolymer.

DESCRIPTION OF THE INVENTION

TFE/HFP copolymers having a particularly desirable balance of physical properties and fabrication characteristics will have melt viscosities between $5 \times 10^4$ and $25 \times 10^4$ poise at 372°C. It has been discovered that the degree to which foaming occurs is strongly dependent on the melt viscosity of the homogenous TFE/HFP copolymer subjected to the treatment. This is shown in the FIGURE wherein it is seen that the degree of foaming reaches a peak at about $8 \times 10^4$ poise and that a copolymer in which the final melt viscosity is below about $5 \times 10^4$ poise at 372°C. does not foam too badly and that a copolymer in which the final melt viscosity is above about $13 \times 10^4$ poise at 372°C. does not foam badly either. It is hypothesized that when the viscosity is low, the bubbles formed by the gases driven off burst and collapse, thus reducing the foaming; while when the viscosity is high, the copolymer is too viscous to allow bubble expansion and thus the amount of foaming is reduced. The FIGURE shows that foaming is worse at melt viscosities between about $5 \times 10^4$ and $13 \times 10^4$, yet it is within this viscosity range that blends of copolymers possess attractive and useful properties.

In the present invention, high- and low-viscosity TFE/HFP copolymers are separately subjected to the humid heat treatment and then blended. It is surprising that the degree of foaming depends on the melt viscosity and falls to such a low degree for both high and low viscosity copolymers, that each can be subjected to the humid heat treatment without substantial foaming, and then combined to obtain a blend of copolymers having a melt viscosity that is within the range of that of a badly foaming copolymer.

The blend of copolymers can contain one high and one low melt viscosity component, or it may contain more than one high melt viscosity component, more than one low melt viscosity component and may also contain one or more components having the middle melt viscosity range (e.g. $5 \times 10^4$ to $13 \times 10^4$), i.e., the badly foaming range.

The calculation of how much of each blend component to use in a preferred embodiment to obtain a desired melt viscosity (MV) at 372°C. of a final blend Z can be found by mixing N components A+B+ ... N according to the following relationship:

$$kg_Z (MV)_Z^{\frac{1}{4.5}} = kg_A (MV_A)^{\frac{1}{4.5}} + kg_B (MV_B)^{\frac{1}{4.5}} \ldots kg_N (MV_N)^{\frac{1}{4.5}}$$

This calculation provides the melt viscosity of a final blend ($MV_Z$) assuming no viscosity change occurs during the extrusion process. Actually, melt viscosity will change during such process and the calculation must be adjusted in practice in accordance with the viscosity change. For example, if the melt viscosity has been found to be decreasing during such process by about 4 × 10⁴ poises and the desired viscosity of the blend is 8 × 10⁴ poise, the blend would be calculated on the basis of a melt viscosity of 12 × 10⁴ poises. "kg" equals weight in kilograms.

The TFE/HFP copolymer used has a hexafluoropropylene content high enough that the copolymer is melt-processible and low enough that it is a plastic rather than an elastomer. The hexafluoropropylene content should be between about 6.75 and about 27 weight percent of the copolymer and preferably between about 14 and 18 weight percent. The copolymers are prepared by reacting tetrafluoroethylene and hexafluoropropylene in an aqueous system containing a dispersing agent and a free radical polymerization initiator according to procedures disclosed in Couture U.S. Pat. No. 3,132,124. By varying the amount of initiator, copolymers of varying melt viscosity can be obtained. For example, to obtain copolymers of high melt viscosity, the amount of initiator is decreased; and to obtain copolymers of low melt viscosity, it is increased.

In the humid heat treatment employed herein, the copolymer is heated at an oven temperature between about 340°C. and about 380°C. for between about 2 and 5 hours at about atmospheric pressure in an atmosphere of air containing between about 3% and about 20% of water vapor, based on weight of atmosphere. Pressure is not critical and is usually atmospheric.

Melt viscosityy is measured according to American Society of Testing Materials test D-1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372°C. ± 1°C. Five minutes after the sample is charged to the cylinder it is extruded through a 2.10 mm (0.0825 inch) diameter, 8.00 mm (0.315 inch) long square-edged orifice under a load (piston plus weight) of 5000 grams. This corresponds to a shear stress of 0.457 kilograms per square centimeter (6.5 pounds per square inch). The melt viscosity in poises is calculated at 53150 divided by the observed extrusion rate in grams per minute.

All references to melt viscosity made hereinabove and hereinafter refer to melt viscosity measured at 372°C.

The polymer used in this invention is ordinarily a copolymer of tetrafluoroethylene and about 16 wt % hexafluoropropylene polymerized according to the general procedure set forth in U.S. Pat. No. 3,132,124. After coagulation by high shear agitation the copolymer fluff appears dry but actually contains considerable water. Excess water is removed by placing 100 g of the copolymer in a cylindrical mold about 14 cm in diameter, the bottom of the mold containing absorbent paper. On top of the paper is placed a wire screen and then a glass cloth. The mold is closed and pressed at 700 kg/cm² to remove excess water (about 10% moisture remained). A sample of the copolymer is oven dried at 125°C. for 4–5 hours for use in determining the melt viscosity of the compacted fluff.

For the humid heat treatment, aluminum test tubes 1.9 cm in diameter are made by shaping aluminum foil to the outside of a glass test tube. A weighed sample of compacted fluff is placed in an aluminum test tube. The aluminum test tube is placed inside a 2.5 cm glass test tube which is placed in a hole in a massive metal block maintained at a constant temperature. Air is passed through a water bubbler in a 40°C. thermostat and into the aluminum tube at a rate of 150 ml/min. At the end of predetermined time the glass test tube is removed from the metal block and cooled in air. Then the aluminum is peeled from the foamed polymer and the height and melt viscosity of the foamed polymer sample are measured.

The data in the FIGURE shows that melt viscosity is a very influential variable in determining the amount of foaming. The copolymers employed in obtaining the data were prepared by the general method described in Couture U.S. Pat. No. 3,132,124. Some of the copolymers were made using ammonium persulfate (APS) initiator; others were made with potassium persulfate (KPS); some were made with ammonium perfluorooctanoate (C-8) as the dispersing agent; others used the dispersing agent prepared in situ according to U.S. Pat. No. 1,132,124. These variables proved to be unimportant since all the data fit the smooth curve shown in the FIGURE. The sample size was 7.0 g, the metal block was at 370°C., and the tube was in the block for 2 hours. In the FIGURE, the ordinate is the height of the foamed sample after it has cooled and the aluminum has been peeled off. The abscissa is the melt viscosity of the final product, measured on a sample from each foamed sample. The data shows that severe foaming occurs at 370°C. in making final product with a melt viscosity of between about 5 × 10⁴ and 13 × 10⁴ poises. Polymer of melt viscosity below 5 × 10⁴ or above 13 × 10⁴ is not nearly as severe in foaming tendency.

In carrying out this invention, the copolymers can be prepared like the ones used in the paragraph above except that the amount of initiator is varied to obtain copolymers of melt viscosity of below about 5 × 10⁴ and above about 13 × 10⁴. These copolymers are then subjected separately to the humid heat treatment, and then blended to obtain the final blend.

The copolymer blends obtained by this invention have good high temperature stability, good electrical insulating properties, chemical inertness and toughness. They can be melt extruded into a variety of shaped articles such as films, filaments, tubing, wire covering and other items for use in applications where the aforecited properties are desirable.

The embodiments of the invention in which an exclusive property or privilege is claimed are defined as follows:

1. A process which comprises heating separately in an atmosphere of air containing between about 3% and about 20% of water vapor, based on weight of atmosphere, at between about 340°C. and about 380°C. for a time sufficient to remove substantially all volatiles, groups of melt-processible copolymers of tetrafluoroethylene and hexafluoropropylene having between about 6.75 and about 27 weight percent hexafluoroethylene:

A. one said group of such copolymers comprising at least one or more copolymers having a melt viscosity that is between about $13 \times 10^4$ and $50 \times 10^4$ poise at 372°C.;

B. a second said group of such copolymers comprising at least one or more copolymers having a melt viscosity that is between about $1 \times 10^4$ and $5 \times 10^4$ poise at 372°C.; and C. optionally, a third said group of such copolymers comprising at least one or more copolymers having a melt viscosity of between about $5 \times 10^4$ and $13 \times 10^4$ poise at 372°C.; and after heating, combining group (A) with group (B) and optionally group (C) in such a ratio so as to obtain a final blend product having a melt viscosity between $5 \times 10^4$ and $13 \times 10^4$ poise at 372°C.

2. The process of claim 1 wherein the melt viscosity desired in the final blend is between about $5 \times 10^4$ and about $25 \times 10^4$ poises at 372°C.

3. The process of claim 1 wherein no third group is present in the blend.

4. The process of claim 1 wherein the air contains between about 3% and about 6% water vapor.

* * * * *

UNITED STATES PATENT OFFICE
CERTIFICATE OF CORRECTION

PATENT NO. : 4,001,351
DATED : January 4, 1977
INVENTOR(S) : Miguel Jacinto Roura It is certified that error appears in the above-identified patent and that said Letters Patent are hereby corrected as shown below:

Column 5, line 12 "ethylene" should read -- propylene --.

Signed and Sealed this

Third Day of May 1977.

[SEAL]

Attest:

RUTH C. MASON
Attesting Officer

C. MARSHALL DANN
Commissioner of Patents and Trademarks